United States Patent
Wolf (10) Patent No.: US 10,374,482 B2
(45) Date of Patent: Aug. 6, 2019

(54) MOTOR MOUNTING DEVICE

(71) Applicant: MAHLE International GmbH, Stuttgart (DE)

(72) Inventor: Walter Wolf, Oppenweiler-Zell (DE)

(73) Assignee: MAHLE International GmbH, Stuttgart (DE)

(*) Notice: Subject to any disclaimer, the term of this patent is extended or adjusted under 35 U.S.C. 154(b) by 326 days.

(21) Appl. No.: 14/957,641

(22) Filed: Dec. 3, 2015

(65) Prior Publication Data

US 2016/0164369 A1  Jun. 9, 2016

(30) Foreign Application Priority Data

Dec. 4, 2014  (DE) .................. 10 2014 224 926

(51) Int. Cl.
| | |
|---|---|
| *H02K 5/24* | (2006.01) |
| *F04D 25/06* | (2006.01) |
| *F04D 25/08* | (2006.01) |
| *F04D 29/66* | (2006.01) |

(52) U.S. Cl.
CPC .............. *H02K 5/24* (2013.01); *F04D 25/06* (2013.01); *F04D 25/08* (2013.01); *F04D 29/668* (2013.01)

(58) Field of Classification Search
CPC .................................. H02K 5/24; H02K 5/26
USPC .................................................... 310/89, 51
See application file for complete search history.

(56) References Cited

U.S. PATENT DOCUMENTS

| | | | |
|---|---|---|---|
| 6,076,795 A * | 6/2000 | Scheidel | F04D 29/668 248/603 |
| 6,505,807 B1 | 1/2003 | Nolting et al. | |
| 7,056,102 B2 * | 6/2006 | Cremer | B60K 15/077 417/363 |
| 8,585,005 B2 | 11/2013 | Krempel et al. | |
| 8,596,596 B2 | 12/2013 | Naji et al. | |
| 9,660,498 B2 | 5/2017 | Truillet et al. | |
| 2001/0019098 A1 * | 9/2001 | Guyomard | B60K 11/04 248/562 |
| 2006/0090522 A1 * | 5/2006 | Kraffzik | F16F 3/0873 68/3 R |
| 2008/0042039 A1 * | 2/2008 | Krempel | B60H 1/00457 248/560 |
| 2009/0189052 A1 * | 7/2009 | Naji | F04D 25/08 248/672 |
| 2014/0175926 A1 * | 6/2014 | Truillet | F04D 25/08 310/91 |

FOREIGN PATENT DOCUMENTS

| | | |
|---|---|---|
| CN | 101488683 A | 7/2009 |
| CN | 103384956 A | 11/2013 |

(Continued)

OTHER PUBLICATIONS

Machine Translation, JOSE, FR 2711459 A1, Apr. 1995.*

*Primary Examiner* — Thomas Truong
(74) *Attorney, Agent, or Firm* — Muncy, Geissler, Olds & Lowe, P.C.

(57) ABSTRACT

A motor mounting device having a motor adapter that is formed substantially ring-shaped or pot-shaped and is used to receive a motor, and having a motor mount, which is used to hold the motor adapter, whereby elastic damping elements are disposed between the motor adapter and the motor mount, whereby the damping elements are formed as extruded profiles.

14 Claims, 8 Drawing Sheets

(56) References Cited

FOREIGN PATENT DOCUMENTS

| | | |
|---|---|---|
| DE | 33 04 236 A1 | 8/1984 |
| DE | 42 42 701 A1 | 6/1994 |
| DE | 101 53 908 A1 | 5/2003 |
| EP | 1648075 A1 | 4/2006 |
| EP | 1 886 852 A1 | 2/2008 |
| FR | 2711459 A1 * | 4/1995 ......... F04D 25/0613 |
| WO | WO 01/54252 A1 | 7/2001 |

* cited by examiner

MOTOR MOUNTING DEVICE

This nonprovisional application claims priority under 35 U.S.C. § 119(a) to German Patent Application No. 10 2014 224 926.0, which was filed in Germany on Dec. 4, 2014, and which is herein incorporated by reference.

BACKGROUND OF THE INVENTION

Field of the Invention

The invention relates to a motor mounting device, particularly for a blower motor of a ventilation, heating, or air conditioning unit of a motor vehicle.

Description of the Background Art

Motor mounting devices are used to hold a blower motor and to support it elastically. A motor adapter is provided for this purpose, which surrounds the housing of the electric motor substantially in the shape of a pot and thus holds the blower motor. A motor mount is provided, furthermore, which holds the blower motor with the motor adapter, whereby damping elements, which dampen vibrations, are disposed between the motor adapter and the motor mount. Thus, the blower motor is received in the motor adapter and held in a vibration damping manner against the motor mount, so that vibrations in the region of the blower motor are not transmitted by structure-borne sound to other vehicle parts, a situation that could be perceived as annoying by the occupants. Such motor mounting devices are disclosed, for example, by DE 101 53 908 A1, which is incorporated herein by reference.

In the conventional art, damping elements are made as silicone elements, which, for example, are produced by the LSR process for injection molding liquid silicone or according to the MQV process. This is complicated in terms of production which is why damping elements are expensive.

EP 1886 852 A1, which corresponds to U.S. Pat. No. 8,585,005, also discloses a motor mounting device, in which the damping elements are injection molded between the motor adapter and the motor mount and made as an integrated element.

WO 01/54252 A1, which corresponds to U.S. Pat. No. 6,505,807, as well discloses a motor mounting device with an injection-molded damping element, which alternatively can also be vulcanized or glued on. As a result, a complicated production method is also disclosed which is accordingly expensive in terms of production.

SUMMARY OF THE INVENTION

It is therefore an object of the invention to provide a motor mounting device which is simple in structure and still cost-effective to manufacture.

An exemplary embodiment of the invention relates to a motor mounting device having a motor adapter, which is formed substantially ring-shaped or pot-shaped and is used to receive a housing of an electric motor, and having a motor mount, which is used to hold the motor adapter, whereby elastic damping elements are disposed between the motor adapter and the motor mount, characterized in that the damping elements are formed as extruded profiles. As a result, the damping element can be produced cost-effectively and trimmed to the required length, so that it can be produced as a type of kit and can also be used in different application examples.

The motor mount can surround the motor adapter substantially in the shape of a ring and the damping elements are disposed between the motor adapter and the motor mount, distributed over the circumference of the motor adapter and motor mount. The motor adapter holds the electric motor on its housing and the motor mount supports the motor adapter. To this end, for vibration decoupling the damping elements are advantageously disposed between the motor mount and motor adapter.

The motor mount can partially surround the motor adapter substantially with a number of fingers, such as with three fingers, and the damping elements are disposed between the motor adapter and the motor mount, distributed over the circumference of the motor adapter and motor mount.

The damping elements can be disposed at an angular distance of 60° and/or 120° to one another. As a result, the damping elements can be disposed advantageously at vibration nodes in order to achieve effective damping.

At least two of the damping elements or the damping elements can be disposed substantially at a same axial height and/or that at least individual damping elements are disposed offset to one another in the axial direction. Their action is especially effective as a result, because the amplitude of the vibration can be dampened especially well.

The damping elements can be disposed substantially at the axial height of the center of gravity of the electric motor. Their action is especially effective as a result, because the amplitude of the vibration of the center of gravity can be dampened especially well.

In an embodiment, first damping elements can be disposed substantially at a first axial height and second damping elements can be disposed substantially at a second axial height, whereby a first and a second damping element each are disposed alternately on the circumference of the motor adapter and motor mount. An advantageous damping arrangement can also be achieved thereby.

In an embodiment, first damping elements transmit a force in a first axial direction between the motor mount and motor adapter and second damping elements transmit a force in a second axial direction between the motor mount and motor adapter, whereby the second axial direction is oriented opposite to the first axial direction. Thus, the damping elements can be used so that in each case they transmit forces in one of the two axial directions, so that they can also be used in such a way.

The damping elements can have a longitudinal direction in the extrusion direction, whereby at least individual damping elements or all damping elements are disposed with their longitudinal direction in the axial direction, in the radial direction, and/or in the tangential direction, or in the circumferential direction. As a result, the damping direction can be predetermined by selecting the position of the damping elements.

Furthermore, in an exemplary embodiment, first retaining elements for holding the damping elements can be disposed on the motor mount and second retaining elements for holding the damping elements can be disposed on the motor adapter, so that a damping element can be disposed between a first retaining element and a second retaining element. Thus, the damping element can be used advantageously in the first or in the second retaining element, so that when the motor mount and motor adapter are joined the damping elements can also engage in the other respective retaining elements.

The retaining elements can be formed as snap-in hooks and/or radial rib elements or have said hooks or elements. The damping elements can then be pushed over the snap-in hooks until these snap back and hold the damping element, whereby the rib element can serve as a stop and/or as a lateral guide.

The damping elements can be formed of silicone, a thermoplastic elastomer, or of a rubber-elastic material.

Furthermore, the at least one damping element can be formed, in terms of cross section, triangular, quadrangular, rectangular, square, rhombic, round, O-shaped, P-shaped, D-shaped, d-shaped, H-shaped, C-shaped, V-shaped, U-shaped, Z-shaped, T-shaped, E-shaped, or L-shaped.

The at least one damping element can be formed as a hollow body or as a solid body. The damping effect of the damping element can be adjusted or set by its design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
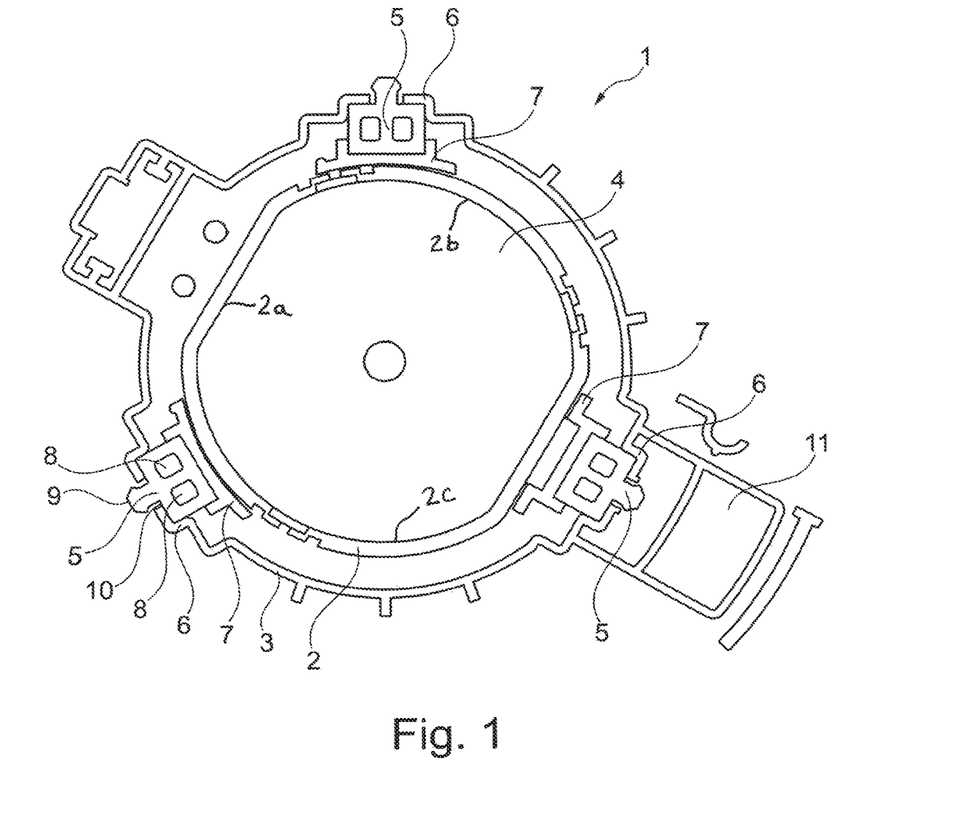
FIG. 1 shows a sectional structure of a motor mounting device.

FIG. 1 in a schematic illustration shows a motor mounting device 1 in a sectional view. Motor mounting device 1 has a motor adapter 2 for receiving and holding a motor 4, such as particularly a blower motor of a ventilation, heating, or air conditioning unit. The motor in this case is made as an electric motor and is used in particular to produce an air stream. Motor adapter 2 is advantageously made ring-shaped or pot-shaped and surrounds the housing of motor 4 in this exemplary embodiment, for example, with three fingers 2a, 2b, 2c only partially or incompletely or alternatively also completely. A motor mount 3 is provided, furthermore, which surrounds motor adapter 2 substantially completely and which can be fastened, for example, on the vehicle side.

Motor mount 3 is used to hold motor adapter 2 received in it. Elastic damping elements 5 are disposed between motor adapter 2 and motor mount 3 for vibration decoupling. These are formed as an extruded profile for better manufacturability.

FIG. 1 shows that three damping elements, arranged at an angle of about 120° to one another, are disposed between motor mount 3 and motor adapter 2. Damping elements 5 in this case are received in retaining elements 6, 7 between motor adapter 2 and motor mount 3. To this end, retaining elements 6 are disposed on motor mount 3 and retaining elements 7 on motor adapter 2, so that each damping element 5 is received in a retaining element 6 and in a retaining element 7. Retaining elements 6, 7 form receptacles for receiving damping elements 5. Retaining element 6 is formed as a single piece with motor mount 3. Retaining element 7 is not formed as a single piece with motor adapter 2 but as a part that can be connected to it. Nevertheless, retaining element 7 can also be formed as a single piece with motor adapter 2.

Damping elements 5 have an approximately rectangular contour with two hollow chambers 8, so that the material of the damping element forms the rectangular contour with a partition wall. A type of projection 9, which serves to engage in a type of receptacle 10 in motor mount 3, is provided on the one side. Damping element 5 can be securely placed thereby in motor mount 3.

A channel 11, which leads to the interior of motor mount 3 and serves as a ventilation channel, is provided to the side of motor mount 3.

Figure 2:
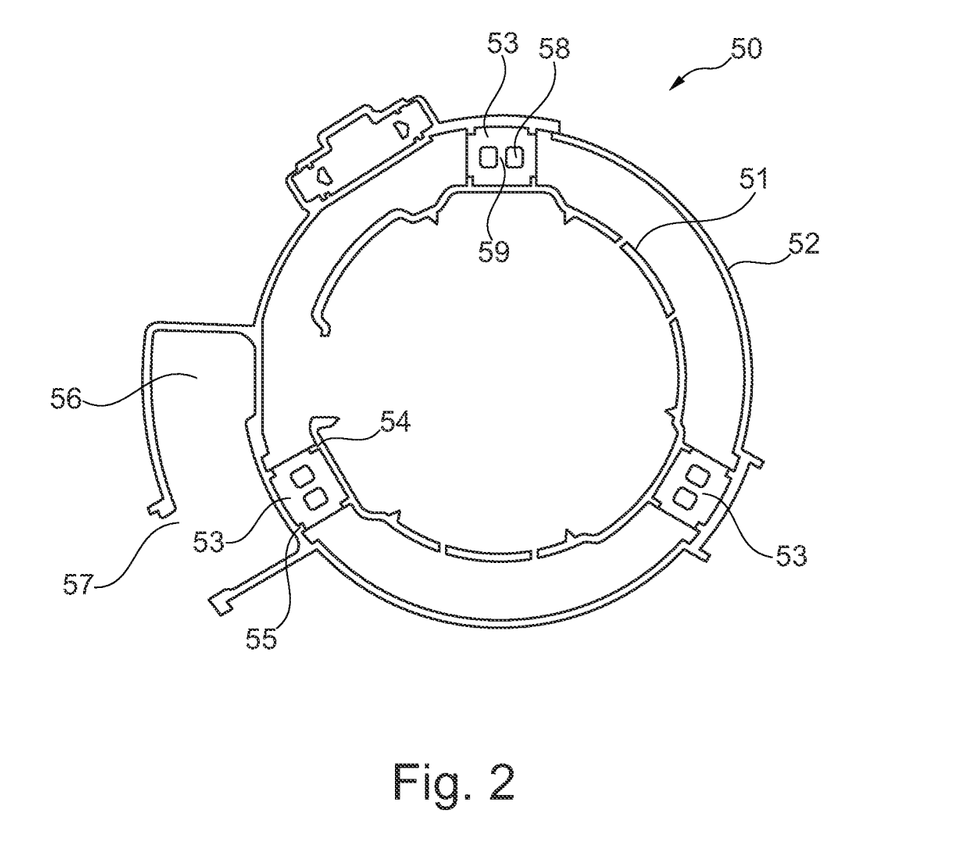
FIG. 2 shows another sectional structure of a motor mounting device.

FIG. 2 shows an alternative embodiment of a motor mounting device 50 in a sectional view, a substantially ring-shaped motor adapter 51 and a substantially ring-shaped motor mount 52 being provided in said embodiment. Three damping elements 53, which are received in each case in a retaining element 54 of motor adapter 51 and in a retaining element 55 of motor mount 52, are again provided between motor adapter 51 and motor mount 52. Retaining elements 54, 55 are formed by lateral bars or ribs and define the space for receiving damping elements 53. An air channel 56 with ventilation opening 57 is provided to the side of motor mount 52, in order to be able to ventilate the interior of motor mount 52 or of motor adapter 51 and thereby to cool the blower motor.

Damping elements 53 are formed as approximately rectangular blocks as extruded profiles, which have two continuous openings 58, separated from one another by a partition wall 59.

Figure 3:
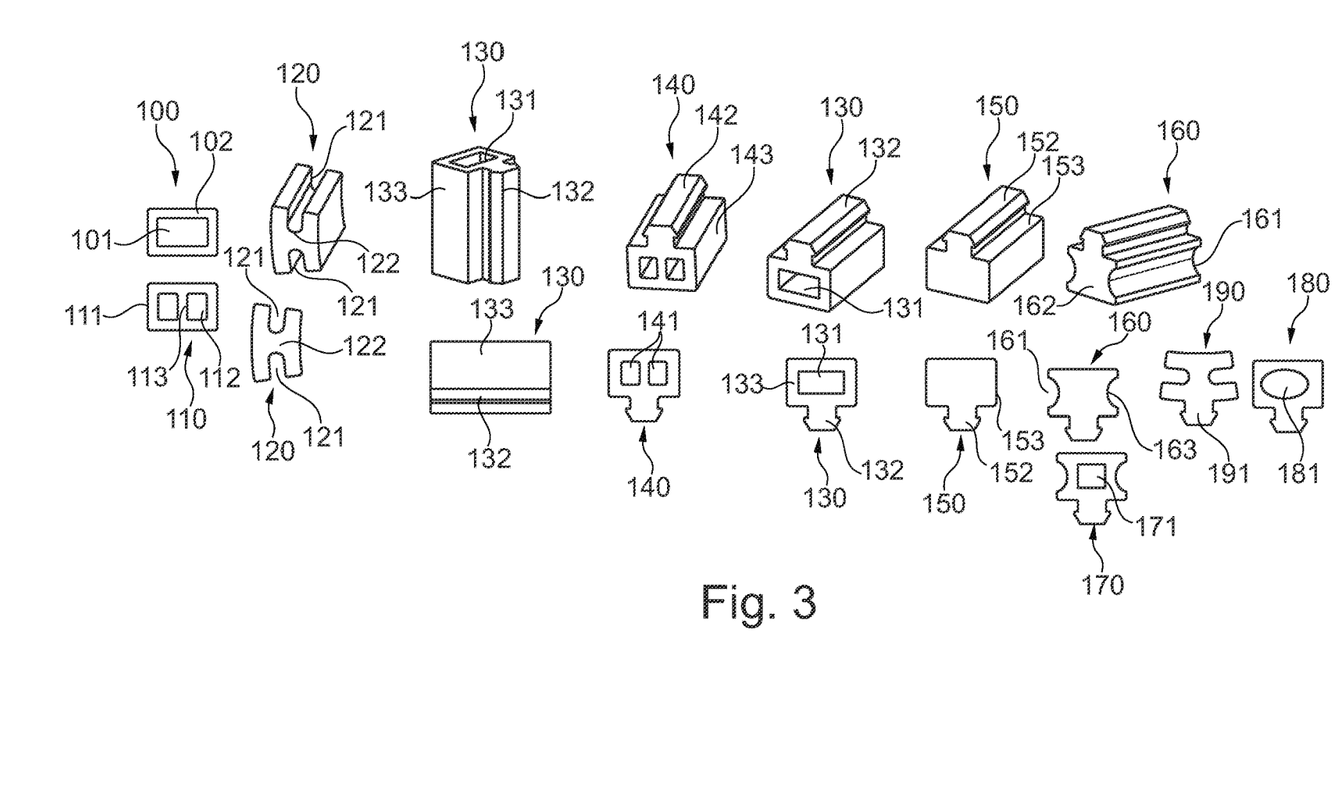
FIG. 3 shows a plurality of various damping elements.

FIG. 3 in a group view shows a plurality of exemplary embodiments of damping elements.

Damping element 100 is shown in a sectional view and is formed approximately rectangular, whereby it is illustrated as being hollow with a central recess 101. Recess 101 is surrounded by a circumferential wall 102.

Damping element 110 is shown in a sectional view and is formed approximately rectangular, whereby it is shown as being hollow with two approximately central recesses 112, separated by a partition wall 113. Recesses 112 are surrounded by a circumferential wall 111.

Damping element 120 is formed approximately like a circular arc segment and has two lateral grooves 121, so that damping element 120 is formed as an approximately curved H-shaped element. Grooves 121 do not quite reach the middle, so that a central bar 122 remains.

Damping element 130 is shown in a perspective illustration and from the side. It is formed approximately rectangular in cross section, whereby it is shown as being hollow with a central recess 131. A bar 132, which extends in the longitudinal direction and has a bevel and an undercut on its top side, is disposed on one of the circumferential outer walls 133. As a result, bar 132 can be inserted and snapped into a receptacle or an opening.

Damping element 140 is shown in a perspective illustration and in cross section. It is formed approximately rectangular in cross section, whereby it is shown as hollow with two central recesses 141. A bar 142, which extends in the longitudinal direction and has a bevel and an undercut on its top side, is disposed on one of the circumferential outer walls 143. As a result, bar 142 can be inserted and snapped into a receptacle or an opening.

Damping element 150 is shown in a perspective illustration and in cross section. It is formed approximately rectangular in section, whereby it is not formed hollow but rather as solid. A bar 152, which extends in the longitudinal direction and has a bevel and an undercut on its top side, is disposed on one of the circumferential outer walls 153. As a result, bar 152 can be inserted and snapped into a receptacle or an opening.

Damping element 160 corresponds substantially to damping element 150, whereby curved recesses 163 are introduced on two opposite sides 161 of base body 162.

Damping element 170 corresponds substantially to damping element 160, whereby a rectangular recess 171 is provided in the base body.

Damping element 180 corresponds substantially to damping element 150, whereby an oval recess 181 is provided in the base body.

Damping element 190 corresponds substantially to damping element 120, whereby a longitudinal bar 191 is provided on one side.

Figure 4:
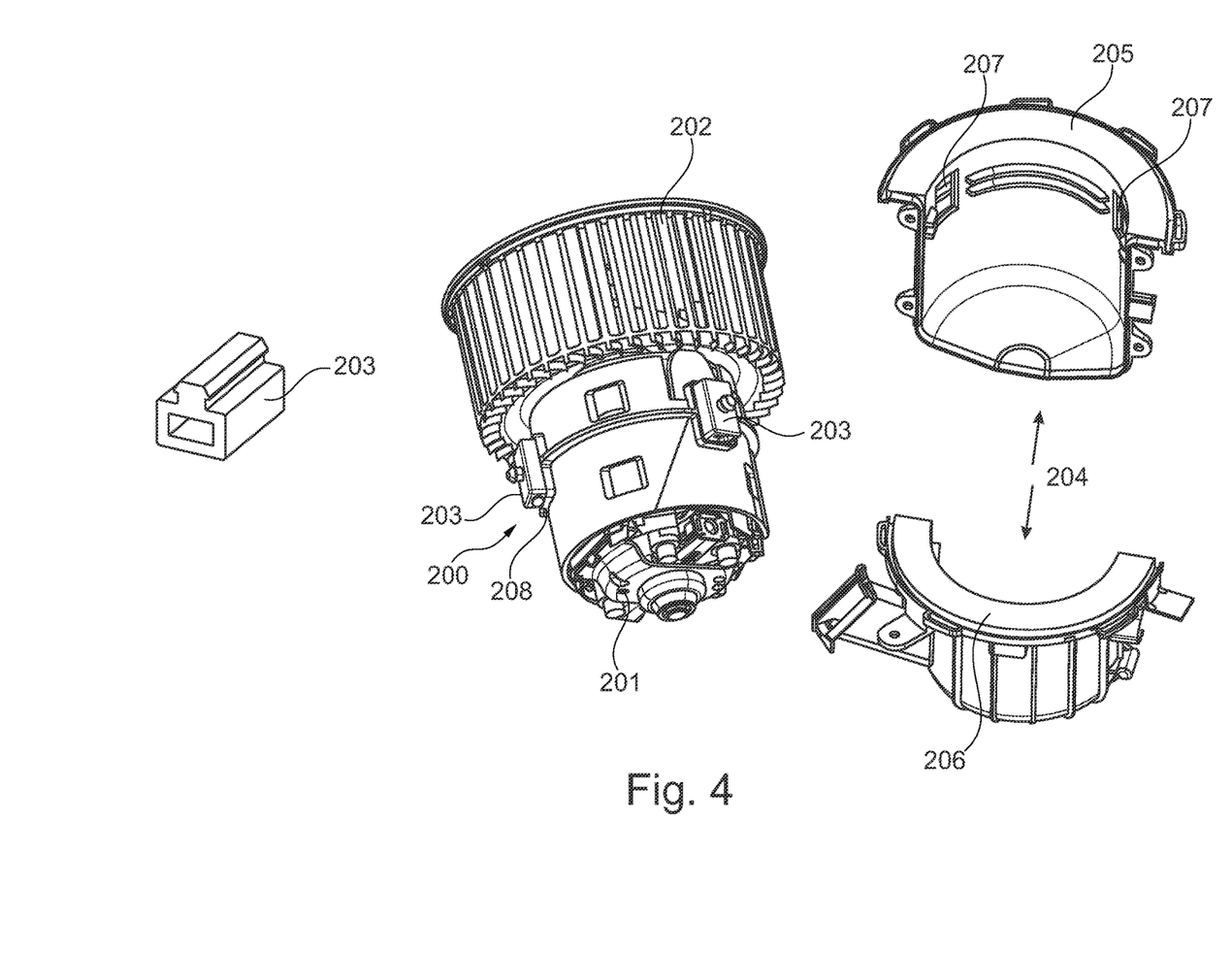
FIG. 4 shows a view of an alternative design of a motor mounting device.

FIG. 4 shows an illustration of a motor adapter 200 with a motor 201 with a blower wheel 202 mounted on the shaft of motor 201. Motor adapter 200 is formed as an annular cylinder and receives the motor housing. Damping elements 203, which engage in receptacles on the side of motor adapter 200, are disposed distributed over the circumference on the outer wall of the motor adapter. In this case, such damping elements 203 are again shown on the left side of the figure by way of example, as they are also shown in FIG. 3. Motor mount 204 is formed as a pot-shaped element, which can be separated along a plane through the central longitudinal axis, so that the two halves 205, 206 can be connected together with the receiving of the motor adapter. In so doing, the two halves of motor mount 204 also have such receptacles 207 for the damping elements.

Figures 5, 13:
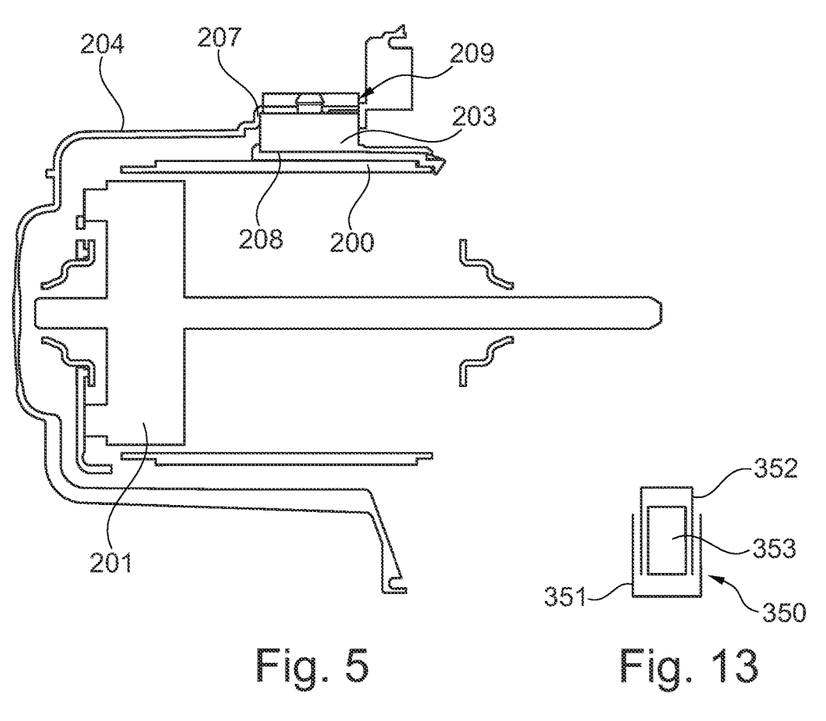
FIG. 5 shows a sectional view of a motor mounting device.
FIG. 13 shows a schematic view of a receptacle of a damping element.

FIG. 5 shows the configuration of a motor 201 with a motor adapter 200 and a motor mount 204 once again in a sectional view. The ring-shaped motor adapter 200 receives the housing of motor 201 and is in turn surrounded by motor mount 204. Damping elements 203 are disposed between motor mount 204 and motor adapter 200. They lie in receptacles 207, 208 or reach through openings 209 of motor mount 204. As a result, damping elements 203 are held securely against loss in motor adapter 204.

Figure 6:
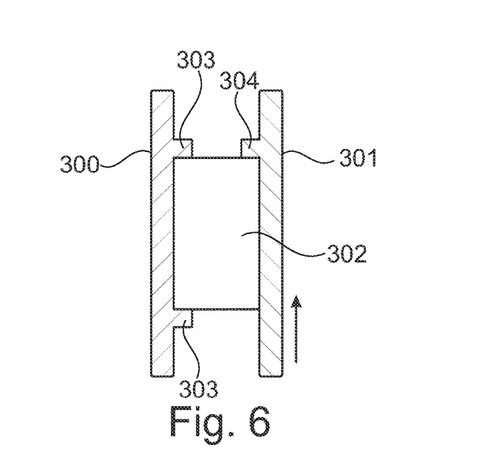
FIG. 6 shows a sectional view of a receptacle of a damping element.

FIG. 6 shows the sectional illustration through a motor adapter 300 and a motor mount 301 in the area of a damping element 302. In this case, damping element 302 is inserted in a receptacle of motor adapter 300, which receptacle is formed by bars 303 or ribs spaced apart at least in the axial direction. If motor adapter 300 is then pushed into motor mount 301, damping element 302 is supported on bar or rib 304. A force can be transmitted in this direction.

Figure 7:
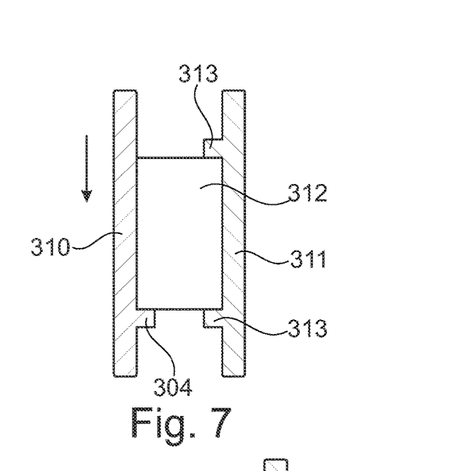
FIG. 7 shows a sectional view of a receptacle of a damping element.

It is expedient further, if according to FIG. 7 damping elements 312 are also provided, which can transmit force in the opposite direction. FIG. 7 shows the sectional illustration through a motor adapter 310 and a motor mount 311 in the area of a damping element 312. In this case, damping element 312 is inserted in a receptacle of motor mount 311, which receptacle is formed by bars 313 or ribs spaced apart at least in the axial direction. If motor adapter 310 is then pushed into motor mount 311, damping element 312 is supported on bar or rib 304. A force can be transmitted accordingly in this direction.

If the two receptacles according to FIGS. 6 and 7 are present in a motor adapter and motor mount, a force can be transmitted in both axial directions and an advantageous damping can be carried out.

Figures 8, 9:
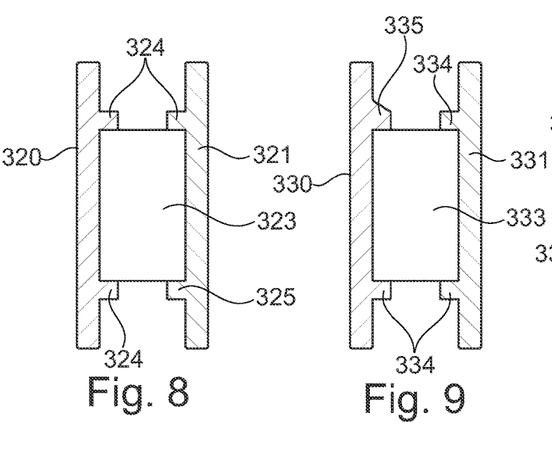
FIG. 8 shows a sectional view of a receptacle of a damping element.
FIG. 9 shows a sectional view of a receptacle of a damping element.
Figure 10:
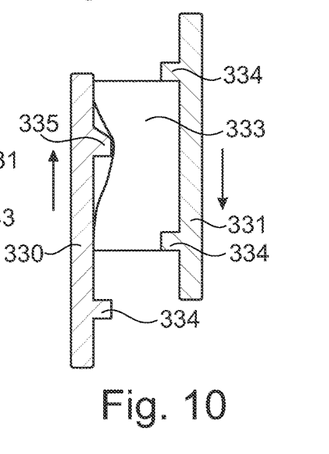
FIG. 10 shows a sectional view of a receptacle of a damping element.

According to FIGS. 8 to 10, ribs 324, 325, 334, 335 are disposed both above and below damping element 323, 333 both on motor mount 321, 331 and also on motor adapter 320, 330. In this regard, one of ribs 335 is beveled, so that the damping element can be pushed over this bevel, as shown in FIG. 10.

Figure 11:
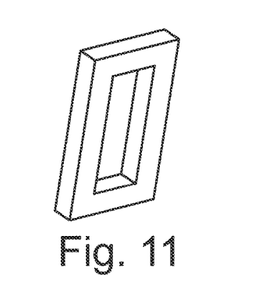
FIG. 11 shows a perspective view of a receptacle of a damping element.
Figure 12:
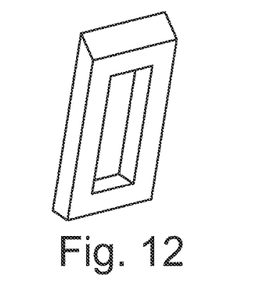
FIG. 12 shows a perspective view of a receptacle of a damping element.

FIGS. 11 and 12 show these receptacles in a perspective view. It is evident that the receptacles are formed by circumferential ribs, one rib of which is beveled.

Instead of the circumferentially disposed ribs with a bevel, the particular receptacle 350 can also be formed u-shaped, whereby the open area is opposite to one another. The two u-shaped rib arrangements 351, 352, as illustrated in FIG. 13 are each formed mutually open and receive a damping element 353.

Figure 14:
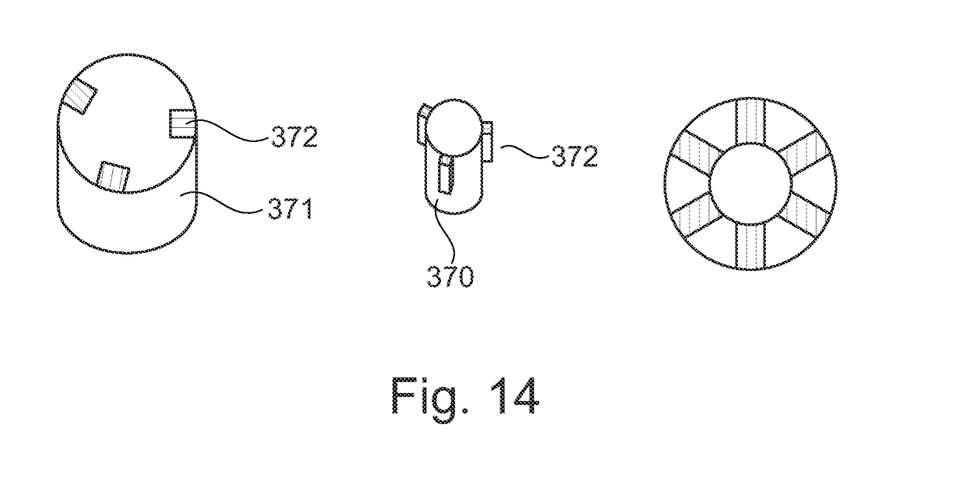
FIG. 14 shows a schematic view to explain the assembly of the damping elements.

The arrangement of damping elements 372 is thereby distributed over the circumference preferably in 60° angular steps, whereby in each case damping elements 372 are inserted at a 120° angular distance jointly in the receptacles of motor adapter 370 or motor mount 371. Accordingly, damping elements 372 thus premounted on motor adapter 370 and motor mount 371 can be mounted together, if motor adapter 370 is pushed into motor mount 371, as shown in FIG. 14.

Figure 15:
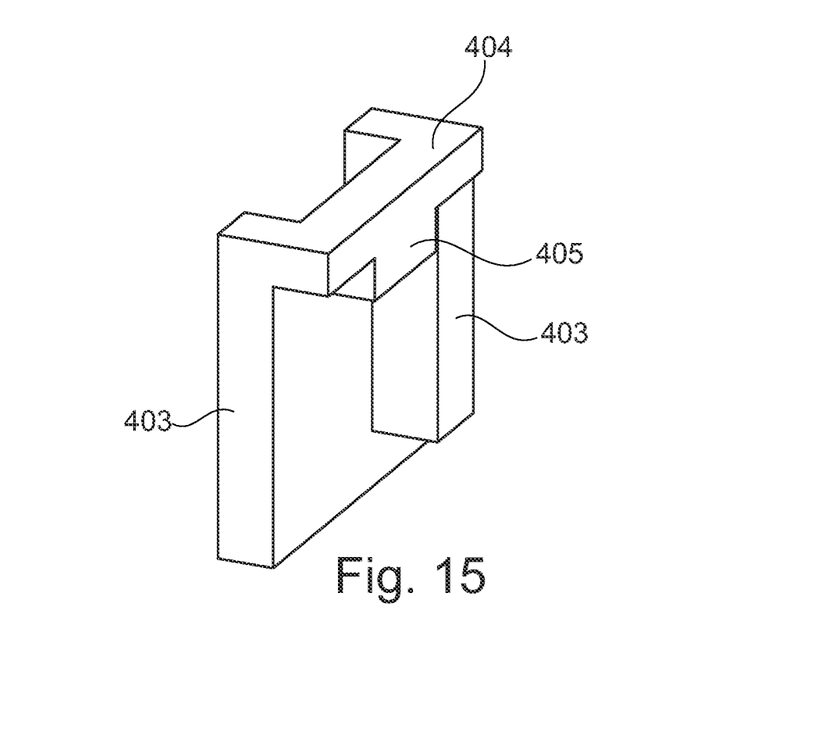
FIG. 15 shows a sectional view of a receptacle of a damping element.
Figure 16:
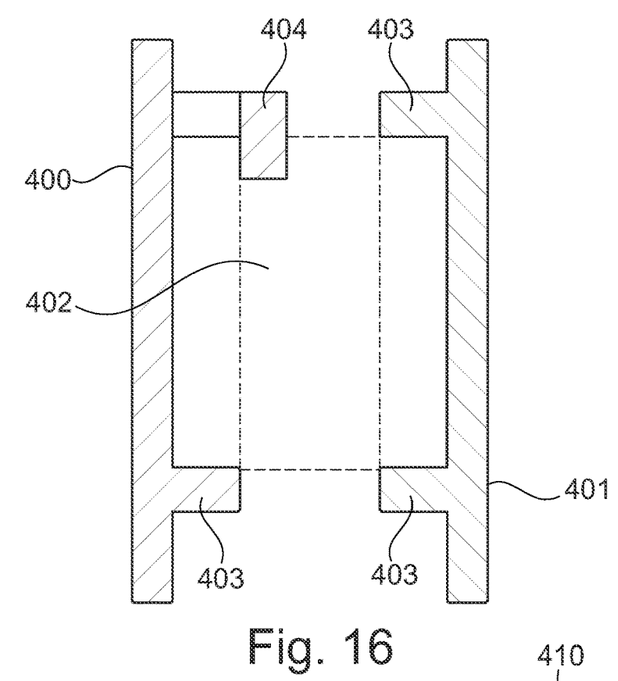
FIG. 16 shows a sectional view of a receptacle of a damping element.
Figure 17:
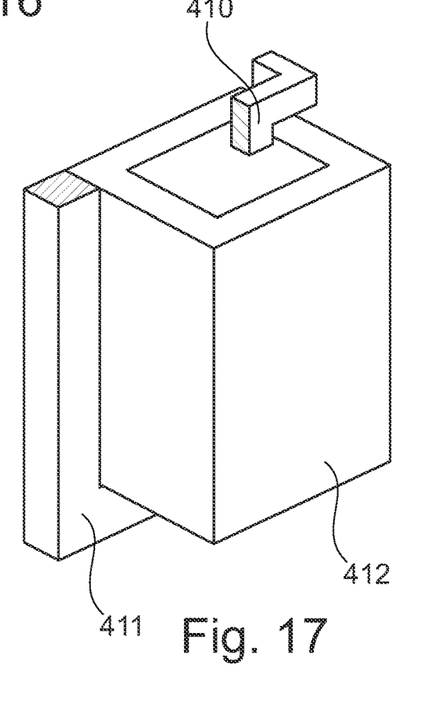
FIG. 17 shows a perspective view of a receptacle of a damping element.

In this case, the receptacles for the damping elements can also be designed so that apart from the lateral ribs, spaced-apart cross-ribs are also provided, on which the damping elements are supported. Such designs are shown in FIGS. 15 to 17. FIG. 16 shows a motor adapter 400 and a motor mount 401 with receptacles 402, formed by ribs 403. These receive damping element 402. In this case, a rib 404 is formed somewhat protruding and is supported on damping element 402 closer to the center thereof, so that a better force transmission occurs.

FIG. 15 shows that protruding rib 404 furthermore has a tongue 405 protruding in the direction to damping element 402.

FIG. 17 shows an example in which protruding rib 404 with tongue 405 is not shown in part for reasons of clarity. Damping element 412 is held in place by ribs 411 arranged in a u-shape and by the protruding rib 410.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor mounting device comprising:
a motor adapter that is formed substantially ring-shaped or pot-shaped and is adapted to receive a motor;
a motor mount adapted to hold the motor adapter; and
elastic damping elements arranged between the motor adapter and the motor mount, the damping elements being formed as extruded profiles,
wherein first retaining elements for holding the damping elements are arranged on the motor mount and second retaining elements for holding the damping elements are arranged on the motor adapter, so that a damping element is arranged between a first retaining element and a second retaining element,
wherein the first retaining element is a first circumferential frame formed of two parallel axial ribs connected together by two parallel radial ribs and the second retaining element is a second circumferential frame formed of two parallel axial ribs connected together by two parallel ribs, and
wherein one of the two parallel radial ribs of the second circumferential frame is beveled to form a beveled surface, such that when the motor adapter is pushed into the motor mount, the damper element is able to be pushed over the beveled surface of the one of the two parallel ribs so that the damper element is pushed into the second circumferential frame.

2. The motor mounting device according to claim 1, wherein the motor mount surrounds the motor adapter substantially in a shape of a ring, and wherein the damping elements are arranged between the motor adapter and the motor mount and distributed over a circumference of the motor adapter and motor mount.

3. The motor mounting device according to claim 2, wherein the damping elements are arranged at an angular distance of 120° to one another.

4. The motor mounting device according to claim 1, wherein the motor adapter surrounds the motor substantially with at least three fingers, such that the motor adapter is formed of the at least three fingers, each of the at least three fingers having a first end and a second end, the first end of each of the at least three fingers being connected to the second end of an adjacent one of each of the at least three fingers to form the ring-shaped or pot-shaped motor adapter, wherein the damping elements are arranged between the motor adapter and the motor mount and distributed over a circumference of the motor adapter and motor mount, and wherein at least one of the second retaining elements is arranged directly on an exterior surface of each of the at least three fingers.

5. The motor mounting device according to claim 1, wherein at least two of the damping elements or wherein the damping elements are disposed substantially at a same axial height or wherein at least individual damping elements are arranged offset to one another in an axial direction.

6. The motor mounting device according to claim 5, wherein the damping elements are disposed substantially at an axial height of a center of gravity of the electric motor.

7. The motor mounting device according to claim 5, wherein first damping elements are arranged substantially at a first axial height, and wherein second damping elements are arranged substantially at a second axial height, and wherein a first and a second damping element are each arranged alternately on a circumference of the motor adapter and motor mount.

8. The motor mounting device according to claim 1, wherein first damping elements transmit a force in a first axial direction between the motor mount and the motor adapter and wherein second damping elements transmit a force in a second axial direction between the motor mount and the motor adapter, and wherein the second axial direction is oriented opposite to the first axial direction.

9. The motor mounting device according to claim 1, wherein the damping elements have a longitudinal direction in an extrusion direction, and wherein at least individual damping elements or all damping elements are arranged with their longitudinal direction in the axial direction, in the radial direction, and/or in the tangential direction, or in the circumferential direction.

10. The motor mounting device according to claim 1, wherein the damping elements are formed of silicone, a thermoplastic elastomer, or of a rubber-elastic material.

11. The motor mounting device according to claim 1, wherein the damping elements, in cross section, are formed triangular, quadrangular, rectangular, square, rhombic, round, O-shaped, P-shaped, D-shaped, d-shaped, H-shaped, C-shaped, V-shaped, U-shaped, Z-shaped, T-shaped, E-shaped, or L-shaped in section.

12. The motor mounting device according to claim 1, wherein at least one of the damping elements is formed as a hollow body or as a solid body.

13. The motor mounting device according to claim 1, wherein the first retaining elements have a receptacle opening, and wherein the damping elements have a projection extending therefrom that extends through the receptacle opening when the damping elements are mounted in the first retaining elements.

14. The motor mounting device according to claim 1, wherein in a fully assembled state, the damper element is not in direct contact with the beveled surface of the one of the two parallel radial ribs of the second circumferential frame.

* * * * *